United States Patent [19]

Estrada

[11] 3,955,443
[45] May 11, 1976

[54] DIFFERENTIAL GEAR MECHANISM WITH ASYMMETRIC PINION GEARS

[76] Inventor: Jose Luis Estrada, 14130 Orange St., Paramount, Calif. 90723

[22] Filed: Jan. 30, 1975

[21] Appl. No.: 545,572

[52] U.S. Cl. ................................. 74/713; 74/710; 74/607
[51] Int. Cl.² ..................... F16H 1/40; F16H 57/02
[58] Field of Search ................. 74/713, 710, 607

[56] References Cited
UNITED STATES PATENTS 1,308,614  7/1919  Baldock ............................. 74/713
3,651,713  3/1972  Mueller ............................. 74/713

Primary Examiner—Benjamin W. Wyche
Assistant Examiner—Lance W. Chandler

[57] ABSTRACT

A high strength differential gearing mechanism for coupling opposed bevel gears on a common axis within an eccentrically weighted casing, and comprising not less than three pinion gears asymmetrically arranged about the common axis, and plural shafts journaling the pinion gears in such asymmetric disposition in counter-balancing relation with the casing.

20 Claims, 7 Drawing Figures

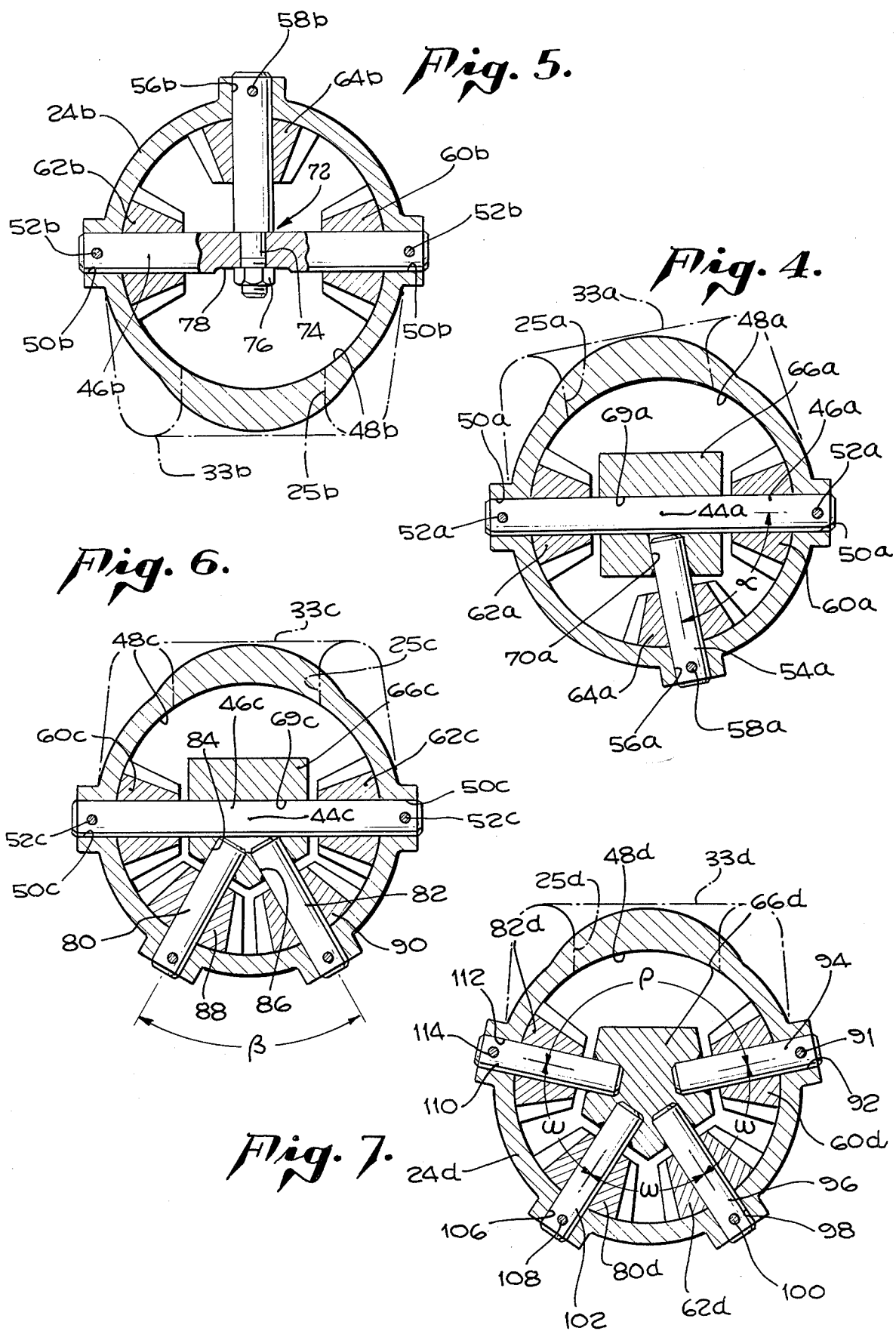

DIFFERENTIAL GEAR MECHANISM WITH ASYMMETRIC PINION GEARS

BACKGROUND OF THE INVENTION

This invention has to do with differential gear assemblies for automobiles trucks and the like, and more particularly, is concerned with differential gear assemblies of increased durability and reliability by virtue of a novel asymmetric arrangement of not less than three pinions in differential engagement with the bevel gears used to transmit power from the propeller shaft drive pinion to the wheel axles.

Differential gear assemblies serve to compensate for different distances traveled by wheels on the inside and outside of a curve. In transmitting power to the wheels of an automobile, a propeller shaft driven by the engine through the gear box drives a ring gear at right angles to the propeller shaft to convert the rotation of the longitudinal power shaft to rotation of the transverse wheel axles. As will be evident upon consideration, a wheel on the outside of a curve travels farther in the same amount of time than the inner wheel opposite it and thus, if tire scuffing is to be avoided, it must rotate relatively faster than the inner wheel. The use of differential gearing to accomplish this result is known. Essentially the "differential," comprising a case, pinions and pinion shafts coupled to the ring gear, turns as a unit along a straightaway but pinions rotate on their axes relative to one another to compensate for the different distances traveled by the inner and outer wheels in turning.

PRIOR ART

Heretofore typically two or four small, symmetrically arranged pinions have been used to compensate for different wheel travel distances. However, where the performance demands are great, the number and size of engaged teeth between the pinion and the bevel gears splined to the wheel axle shafts may be inadequate in strength leading to failure of the differential, loss of power in use, and costly wear or destruction of the mechanism. The use of one or more additional pinions all equidistantly spaced about the bevel gear axis has been proposed e.g. in U.S. Pat. No. 3,593,595 to Taylor. The difficulty with these proposals is the problem of getting adequately sized pinions in the limited volume differential case and the provision of sufficient support therefor within the casing.

SUMMARY OF THE INVENTION

It is accordingly an object of the invention to provide a novel differential gearing mechanism affording the increased durability and toughness of a three or greater pinion mechanism but with ease of assembly, reliability and cost in use which has been lacking in heretofore produced plural pinion differential units.

It is a further object to provide plural pinion differentials in which the arrangement of pinions is adapted to transmission of power with low mechanical losses and with increased tooth engagement over two pinion differentials, and withal an ease of assembly not known in unitary casing plural pinion differentials.

These and other objects of the invention to become apparent hereinafter are realized by the combination, in a differential gear assembly of a unitary eccentrically weighted casing enclosing opposed bevel gears on a common axis and a differential gearing mechanism coupling the bevel gears, the gearing mechanism comprising not less than three pinion gears asymmetrically arranged about the common axis; and shaft means supporting the pinions so disposed in counterbalancing relation to the casing. The casing is in its weighted area for gearing assembly within the casing. The shaft means are typically supported endwise by the casing, and may include a first shaft journaling two of the pinion gears and a second shaft angularly disposed relative to the first shaft and supporting another of the pinion gears, the first and second shafts lying in a common plane and asymmetrically about the bevel gear axis.

The invention further contemplates means interengaging the first and second shafts in pinion gear asymmetry defining relation, such as a reduced diameter second shaft terminal portion, and means formed on the first shaft intermediate its ends to engage the second shaft terminal portion. Further the first shaft may be supported at its opposite ends by the differential casing, the second shaft being also endwise supported at one end opposite the locus of second shaft portion engagement with the first shaft.

Alternatively the shaft support means may comprise a block interfitting the shafts in their defined asymmetric relation.

In a particular embodiment the invention contemplates the shaft means including a first shaft journaling opposed first and second pinion gears, a second shaft journaling a third pinion gear, and a third shaft journaling a fourth pinion gear; the first, second and third shafts all lying in a common plane and relatively disposed in asymmetric relation about the bevel gear axis. As in the previous embodiment there may be provided means interengaging the first, second and third shafts in pinion gear asymmetry defining relation, such as reduced diameter portions on the second and third shafts and means formed on the first shaft intermediate its ends to engage the second and third shaft reduced diameter portions. Such engaging means may comprise two transverse bores sized to receive their respective shaft portions, which portions may be externally threaded, and therefor there may be provided fastener nuts to secure the second and third shafts in the first shaft bores. As in the earlier embodiment, the first shaft may be supported at its opposite ends by the casing, the second and third shafts being supported endwise by the casing opposite their locus of engagement with the first shaft. Also as in the earlier embodiment, in lieu of transverse bores in the first shaft there may be provided as a support for the second and third shafts a block interfitting the shafts in their asymmetric relation, e.g. supported on the first shaft and apertured to receive the second and third shafts.

In still another embodiment the shaft means may include in a common plane first, second, third, and fourth shafts arranged asymmetrically about the axis supported by the casing at one end and each supported at its opposite end in a common central block, the block being apertured to receive the shafts in pinion gear asymmetry defining relation.

BRIEF DESCRIPTION OF THE DRAWINGS

The invention will be further described as to an illustrative embodiment in conjunction with the attached drawings, wherein:

FIG. 4 is a view like FIG. 3 showing an alternate form of pinion shaft interengagement;

FIG. 5 is a view like FIG. 3 showing a variant form of the device shown in FIG. 3;

FIG. 6 is a view like FIG. 3 showing an alternate number of pinion shafts in block supported relation; and FIG. 7 is a view like FIG. 3 showing a further alternate form of the invention.

DESCRIPTION OF THE PREFERRED EMBODIMENTS

Figure 1:
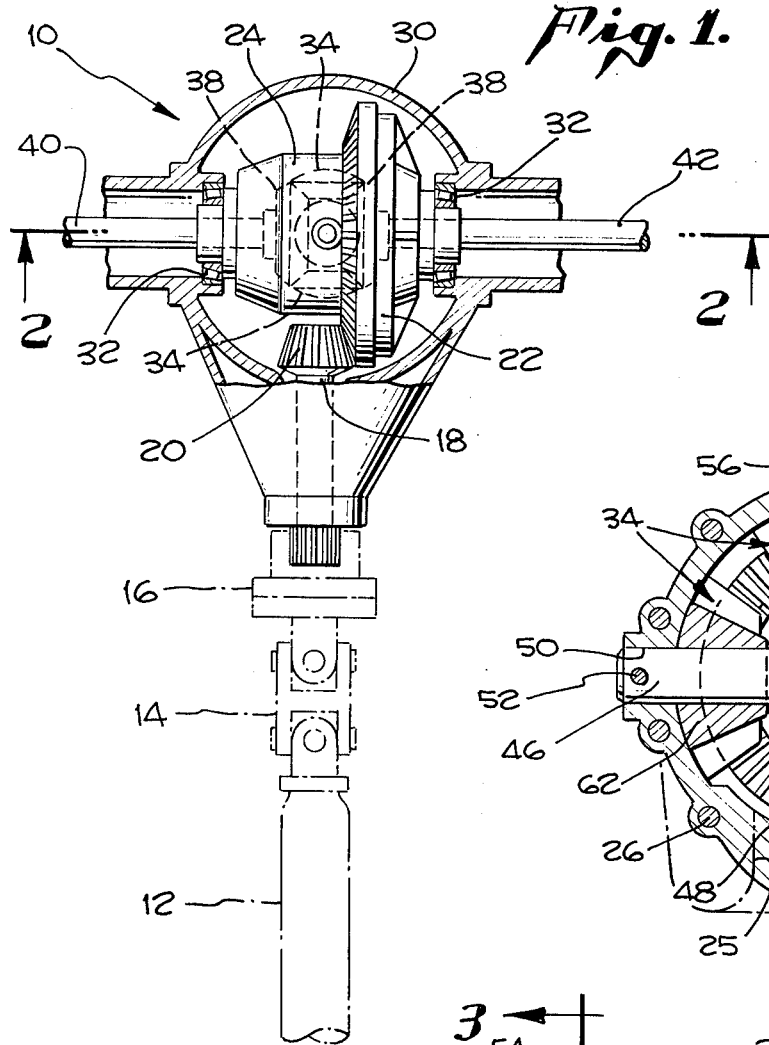
FIG. 1 is a plan view of a differential according to the invention.
Figure 2:
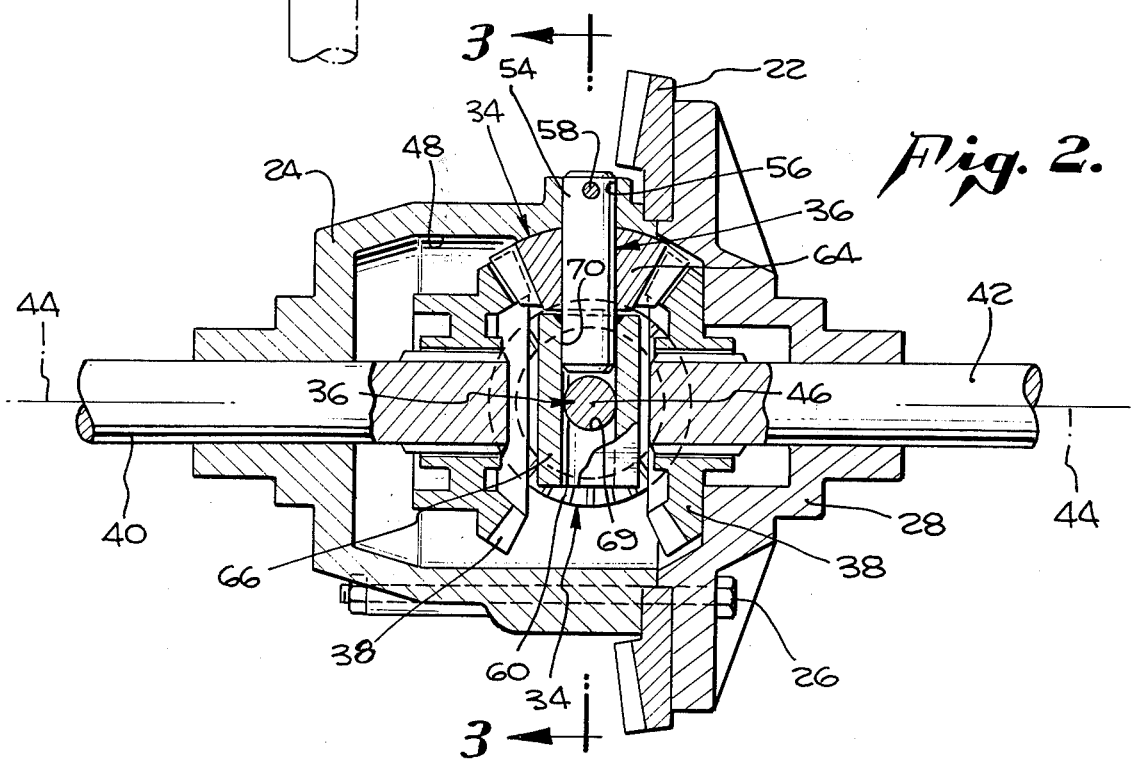
FIG. 2 is a transverse sectional view thereof taken on line 2—2 in FIG. 1.

With reference now to the drawings in detail in FIG. 1 there is shown a rear end assembly 10 including propeller shaft 12 driven rotationally by an engine and gear train (not shown) coupled through universal linkage 14 to flange 16 into which is splined the pinion shaft 18 carrying drive pinion 20 engaged with driver gear 22 which is bolted to the driver pinion carrier, a unitary differential case 24, by bolts 26 through case cover 28 (FIG. 2). The differential case 24 is eccentrically weighted by casting integrally added metal at 33 as shown, or by addition of extra metal to the case about the access opening 25, as shown in phantom in the several Figures, for clarity of illustration in the drawings. The eccentric weighting of the differential case 24 by added metal at 33 or about aperture 25 serves to counterbalance the asymmetrically placed shaft 54, for purposes to appear. The case 24 is supported in axle housing 30 by ball or roller bearings 32. Within the differential case 24 are carried the differential pinion gears 34 on shafts 36 to be hereinafter more fully described, and the differential side gears, or bevel gears 38, which are splined to the left and right axles 40, 42, respectively.

As is known, the rotation of the drive pinion 20 causes the drive gear 22 to rotate. The differential case 24 therefore rotates, carrying the differential pinion shafts 36, and the differential pinion gears 34 around with it. Assuming automobile travel on a straightaway, the differential pinion gears 34 do not rotate on their shafts 36 but deliver equal torque to both bevel gears 38 and thus axles 40, 42 so that both rear wheels (not shown) rotate at the same speed. That is, the differential case 24, the drive gear pinion 34 and bevel gears 38 rotate without relative movement. Unequal speed of rotation of the axles 40, 42 is provided by the differential pinion gears 34 rotating on their own axes on shafts 36; in one direction for more rapid left wheel rotation and in the opposite direction for more rapid right wheel rotation. This pinion operation being known and carried out in the same manner in the present invention, no further elaboration thereof is given herein.

Figure 3:
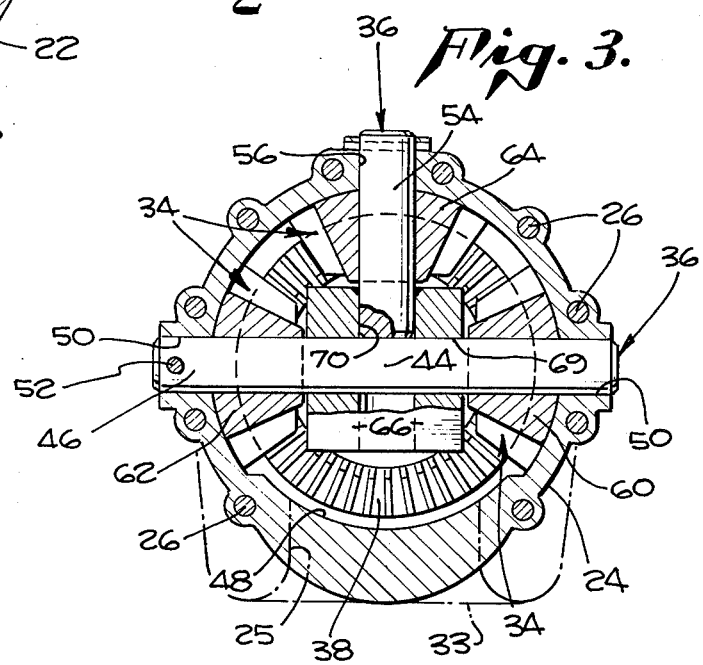
FIG. 3 is a longitudinal sectional view taken on line 3—3 in FIG. 2.

Turning now particularly to FIGS. 2 and 3, added metal 33 is provided in the casing wall 48 opposite the extra pinion 34 which locally unbalances the casing 24. Again with reference to FIGS. 2 and 3, a two pinion shaft differential mechanism is shown in which there is provided an asymmetric arrangement of three pinion gears 34 about the bevel gears common axis 44 (FIG. 2) and in such relation to local eccentric relief 33 on the casing wall 48 as to offset and counterbalance with additional metal weight, the extra asymmetric shaft 54. Specifically, a long cross pinion shaft 46 is fixed in the differential case wall 48 at the diametrical center of the case in opposed apertures 50 and secured there by mounting pin 52. The short pinion shaft 54 is similarly fixed in the differential case wall 48 at aperture 56 disposed normally to the long cross pinion shaft 46 and secured at the case wall aperture by pin 58.

First pinion gear 60 and second pinion gear 62 are journaled on long cross pinion shaft 46 adjacent the case wall 48 and in tooth engagement with left and right bevel gears 38. Third pinion gear 64 is journaled on short pinion shaft 54 and opposite casing wall eccentric added weight 33 to maintain a counterbalance between the casing and the asymmetric pinion gear arrangement. The pinion shafts 46 and 54 may be at right angles to one another as shown in FIGS. 1 - 3 or the short shaft may be disposed at an angle of 79° to the long shaft as shown in FIG. 4. The weight 33 may be superadded to an existing casing, or provided for in the casing casting.

In either event, there is provided in the embodiment shown a support structure supporting the pinion gears 34 in their predetermined asymmetric relationship. In FIGS. 1 - 3, the support structure comprises a block 66, a generally rectangular member having a through bore 69 sized to snugly receive the long pinion shaft 46 and a second bore 70 transverse to the first bore and adapted to snugly receive the short pinion shaft 54, suitably butted against the long shaft. In the described relation, the pinions 60, 62, and 64 are free to rotate on their own axes in their differential function while being asymmetric to the bevel gear axis 44 (of FIG. 2).

In FIG. 4 wherein like parts have like numerals with the addition of an $a$ designator, a form of block 66a is shown in which the transverse bore 70a is at an $\alpha$ angle of 79° to the long shaft bore 68a rather than 90° as shown in FIGS. 1 - 3, as an alternative asymmetric pinion arrangement. Eccentric weight 33a is correspondingly there opposite as shown; assembly access opening 25 being indicated in phantom lines.

A further variant in the invention is shown in FIG. 5 wherein like parts have like numerals with the addition of a $b$ designator. There the long shaft 46b is fixed in the casing wall 48b by pins 52b in apertures 50b and the short pinion shaft 54b is similarly fixed, in casing wall aperture 56b by pin 58b, the pinion gears 60b, 62b, 64b being journaled thereon, as above described. The two pinion shafts are centrally supported by support structure 72 comprising threaded reduced end portion 74 of shaft 54b and nut 76. The nut 76 is threaded onto the short shaft portion 74 and tightened against shaft 46b or as shown received in shallow lateral recess 78 therein. Eccentric weight 33b is placed as in FIGS. 1 - 3.

In FIG. 6 wherein like parts have like numerals with the addition of a $c$ designator, a three pinion shaft, four pinion arrangement is depicted. Again the pinions 34c are asymmetric to the bevel gear axis 44 (cf. FIG. 2) and lie in a common plane with each other. The long shaft 44c is mounted in the support block 66c in through bore 69c while the second pinion shaft 80 and the third pinion shaft 82 are set in their respective block 66c bores 84, 86 at an angle $\beta$ of 60° to each other and respectively to the long shaft. Pinion gears 60c, 62c are journaled on long shaft 46c as first and second pinions, while short shaft 80 journals third pinion 88 and short shaft 82 journals fourth pinion 90. As in the FIG. 5 embodiment, the short shafts 80, 82 may be supported at the long shaft 44c by reduced diameter end portions suitably threaded and coupled with nut fasteners to the long shaft.

In FIG. 7 still another variation is depicted. This is a four pinion shaft, four pinion gear arrangement, and is asymmetric although employing an even number of shafts. In FIG. 7, like parts are given like numerals with the addition of a *d* designator. Thus, with reference to FIG. 7 the casing 24*d* carries: a first short shaft 94 by pin 91 fixed in wall aperture 92 on which shaft is journaled a first pinion gear 60*d*, the opposite or inner end of the shaft being secured in support block 66*d*; a second short shaft 96 on which there is journaled a second pinion gear 62*d*, the shaft being fixed in wall aperture 98 by pin 100 at one end and secured in block 66*d* at the opposite end; a third short shaft 102 on which there is journaled a third pinion gear 80*d*, the shaft being fixed in wall aperture 106 by pin 108 at one end and secured in block 66*d* at the opposite end; and a fourth short shaft 110 on which there is journaled a fourth pinion 82*d*, the shaft being fixed in wall aperture 112 by pin 114 at one end and secured in block 66*d* at the opposite end. The short shafts are disposed at an angle $\omega$ equal to 68° except between shafts 94 and 110 where the angle $\pi$ is 156° and held in that configuration by the casing 24*d* and block 66*d*.

The foregoing plural pinion differentials are asymmetric, enabling the inclusion of additional pinions in a differential case for greater tooth to tooth contact and consequent increased strength and durability in the unit. Moreover, because of their asymmetric orientation these pinions and their shafts may be installed in unitary differential casings eliminating a possible source of failure in the assembled device, while the eccentric weighting of the casing eliminates imbalances in casing rotation.

I claim:

1. In a differential gear assembly, the combination of an eccentrically weighted casing enclosing opposed bevel gears on a common axis and a differential gearing mechanism coupling said bevel gears, said mechanism comprising not less than three pinion gears asymmetrically arranged about said axis in counterbalancing relation with said casing, and shaft means supporting said pinion gears so disposed.

2. The combination according to claim 1, in which said shaft means is supported endwise by the casing.

3. The combination according to claim 1, in which said shaft means includes a first shaft journaling two of said pinion gears and a second shaft angularly disposed relative to the first shaft and supporting another of said pinion gears, said first and second shafts lying in a common plane and asymmetrically about said axis.

4. The combination according to claim 3, including also means interengaging said first and second shafts in pinion gear asymmetry defining relation.

5. The combination according to claim 4 in which said interengaging means comprises a reduced diameter second shaft terminal portion, and means formed on said first shaft intermediate its ends to engage the second shaft terminal portion.

6. The combination according to claim 5 in which said first shaft is provided with a bore sized to receive said second shaft portion.

7. The combination according to claim 5, in which said first shaft is supported at its opposite ends by said casing and said second shaft is endwise supported by said casing opposite the locus of second shaft portion engagement with said first shaft.

8. The combination according to claim 7 in which said second shaft is at an angle of about 79° relative to said first shaft.

9. The combination according to claim 7 in which said second shaft is at right angles to said first shaft.

10. The combination according to claim 4 in which said interengaging means comprises a block interfitting said shafts in their defined asymmetric relation.

11. The combination according to claim 10 in which said second shaft is at an angle of approximately 79° relative to said first shaft.

12. The combination according to claim 10 in which said second shaft is at right angles to said first shaft.

13. The combination according to claim 1, in which said shaft means includes a first shaft journaling opposed first and second pinion gears, a second shaft journaling a third pinion gear, and a third shaft journaling a fourth pinion gear; said first, second, and third shafts lying in a common plane and relatively disposed in asymmetric relation about said axis.

14. The combination according to claim 13 including also means interengaging said first, second and third shafts in pinion gear asymmetry defining relation.

15. The combination according to claim 14, in which said first shaft is supported at its opposite ends by said casing, and said second and third shafts are supported endwise by said casing opposite their locus of engagement with the interengaging means.

16. The combination according to claim 15, in which said interengaging means comprises a block interfitting said shafts in their asymmetric relation.

17. The combination according to claim 16, in which said block is mounted on said first shaft and apertured to receive said second and third shafts.

18. The combination according to claim 17 in which said second and third shafts are at an angle of about 60° to one another and to the first shaft.

19. The combination according to claim 1 in which said shaft means includes in a common plane first, second, third and fourth shafts arranged asymmetrically about said axis supported by the casing at one end and each secured at its opposite end separately in a common support block, said block being apertured to receive said shafts in pinion gear asymmetry defining relation.

20. The combination according to claim 19 in which three of said shafts lie at an angle of 68° to one another.

* * * * *